US012553139B2

(12) United States Patent
Lomas et al.

(10) Patent No.: US 12,553,139 B2
(45) Date of Patent: Feb. 17, 2026

(54) FLUORIDE ION CLEANING SYSTEMS

(71) Applicant: GENERAL ELECTRIC COMPANY, Schenectady, NY (US)

(72) Inventors: Jonathan Matthew Lomas, Simpsonville, SC (US); Shan Liu, Central, SC (US); Michael Anthony DePalma, Simpsonville, SC (US); Malorie Myers Burnette, Greenville, SC (US); James C. Dalton, Marietta, SC (US)

(73) Assignee: GE Infrastructure Technology LLC, Greenville, SC (US)

( * ) Notice: Subject to any disclaimer, the term of this patent is extended or adjusted under 35 U.S.C. 154(b) by 647 days.

(21) Appl. No.: 17/983,713

(22) Filed: Nov. 9, 2022

(65) Prior Publication Data

US 2024/0150902 A1 May 9, 2024

(51) Int. Cl.

| | |
|---|---|
| ***C23G 5/00*** | (2006.01) |
| ***B01F 23/10*** | (2022.01) |
| ***B01F 25/312*** | (2022.01) |
| ***B08B 5/02*** | (2006.01) |
| ***B08B 13/00*** | (2006.01) |
| ***F01D 25/00*** | (2006.01) |

(52) U.S. Cl.

CPC .............. *C23G 5/00* (2013.01); *B01F 23/191* (2022.01); *B01F 25/31252* (2022.01); *B08B 5/02* (2013.01); *B08B 13/00* (2013.01); *F01D 25/002* (2013.01)

(58) Field of Classification Search

CPC .... C23G 5/00; B01F 23/191; B01F 25/31252; B08B 5/02; B08B 13/00; F01D 25/002

See application file for complete search history.

(56) References Cited

U.S. PATENT DOCUMENTS 4,098,450 A * 7/1978 Keller .................... B23K 9/235 29/402.21
4,364,147 A * 12/1982 Biedermann ........... B08B 5/023 15/316.1

(Continued)

FOREIGN PATENT DOCUMENTS

CN 102527567 A * 7/2012
JP WO2017094042 A1 * 9/2018 ............... B08B 3/02

(Continued)

OTHER PUBLICATIONS

WO-2007003615-A1—English Machine Translation (Year: 2007).*
International Search Report for PCT/US2023/078634 received Mar. 5, 2024; 5 pps.

(Continued)

*Primary Examiner* — Marc Carlson
(74) *Attorney, Agent, or Firm* — Armstrong Teasdale LLP

(57) ABSTRACT

A fluoride ion cleaning system is provided. The system includes a retort including an interior sized to receive at least one component therein. The at least one component has a target area defined thereon. The system also includes a gas distribution system. The gas distribution system includes a manifold configured to provide reaction gas within the interior, a flow modulator configured to agitate the reaction gas within the interior, and at least one nozzle in flow communication with the flow modulator. The at least one nozzle is adapted to define an agitated flow of reaction gas at the target area of the at least one component.

14 Claims, 4 Drawing Sheets

(56) References Cited

U.S. PATENT DOCUMENTS

| | | | | |
|---|---|---|---|---|
| 6,536,135 B2 * | 3/2003 | Lipkin | C23G 5/00 34/201 | |
| 8,206,488 B2 * | 6/2012 | Mantkowski | C23G 5/00 95/131 | |
| 2005/0035085 A1 * | 2/2005 | Stowell | C23G 5/00 134/1.1 | |
| 2005/0126605 A1 * | 6/2005 | Yassour | H01L 21/67034 134/198 | |
| 2011/0120972 A1 * | 5/2011 | Faulkner | G01N 21/91 216/57 | |

FOREIGN PATENT DOCUMENTS

| | | | | |
|---|---|---|---|---|
| MY | 156250 A * | 1/2016 | B01D 53/685 | |
| WO | WO-2007003615 A1 * | 1/2007 | F01D 25/002 | |
| WO | WO-2015168691 A1 * | 11/2015 | B01D 19/0005 | |

OTHER PUBLICATIONS

Clavel, Ai; "Vapor Phase lon Processing for Manufacture and Repair of Gas Turbine Superalloy Components;" Technical Report, Ti-Coating, Utica, Michigan; 8 pp.

Miglietti, Warren et al., "Advantages of Fluoride lon Cleaning at Sub-Atmospheric Pressure;" Engineering Failure Analysis, vol. 5, No. 2; pp. 149-169, 1998.

Pochet, Louis F et al.; "The HF "Fluoride-Ion" Cleaning Technique for Superalloys;" Presented at the Gas Turbine Conference and Exhibition, Anaheim, California—May 31-Jun. 4, 1987; 6 pp.

Stankowski, Dr. Alexander, "Advanced Thermochemical Cleaning Procedures for Structural Braze Repair Techniques," Proceedings of ASME Turbo Expo, Amsterdam, The Netherlands—Jun. 3-6, 2002, 15 pp.

Brenneman, Jesse; High-Temperature Oxidation, Fluoride-Ion Cleaning, and Activated Diffusion Brazing of Nickel-Based Superalloy; Thesis presented to University of Waterloo, Waterloo, Ontario, Canada 2011; 141 pages.

* cited by examiner

FLUORIDE ION CLEANING SYSTEMS

BACKGROUND

The present disclosure relates generally to repair operations on gas turbine components and, more specifically, to systems and methods for improved fluoride ion cleaning of gas turbine components.

Aeronautical and power generation turbine components, such as blades, shrouds, and vanes, are often formed from superalloy materials, including but not limited to, nickel-, cobalt-, and iron-nickel-based superalloy materials. During service, turbine components are exposed to high pressure and high temperature environments and may form complex, chemically stable, thermal oxides. These oxides include, but are not limited to, oxides of aluminum, titanium, chromium, and combinations thereof. Turbines are periodically overhauled in order to prolong its service life or enhance performance. During these overhauls, the turbine components may be subjected to various repair operations, including welding or brazing. The presence of chemically stable thermal oxides reduces the ability of a superalloy to be welded or brazed. Therefore, removal of these oxides by cleaning the turbine components prior to repair is important for successful completion of the overhaul.

At least some known high-temperature, reactive-atmosphere batch cleaning processes affect cleaning of chemically stable oxides from turbine components. The processes that generally rely on the high reactivity of fluoride ions for cleaning are collectively known as "fluoride ion cleaning" (FIC) processes. Current embodiments of FIC processes include single volume chambers, or single volume chambers with distribution manifolds, designed to provide uniform heating and working fluid distribution and exchange. As gas turbine components continue to grow in size and as alloys produce increasingly tenacious oxides, FIC cycles have become increasingly difficult to perform and time consuming.

At least some known embodiments of FIC processing, such as a dynamic FIC cleaning process, enable working fluids to flow during operation. Other known FIC processes, such as pulsed FIC processes, operate between alternating pressure and flow conditions to facilitate improving the effectiveness of the cleaning cycles. In addition, at least some known FIC processes operate with an increased flow rate of hydrogen fluoride (HF) to facilitate cleaning more tenacious oxides.

As gas turbine components continue to grow in size and as alloys produce increasingly tenacious oxides, FIC cycles have become increasingly difficult to perform and time consuming. Further confounding the long duration, high concentration cleaning cycles is that undamaged areas on components not needing cleaning for downstream processing are subject to the same cleaning effects, including the increased pressure, flow, and gas concentration states, as damaged areas. As such, the use of such processes may be limited and may be a function of component size, gas supply size, and outlet/scrubber flow capabilities.

BRIEF DESCRIPTION

One aspect is a fluoride ion cleaning system. The system includes a retort including an interior sized to receive at least one component therein. The at least one component has a target area defined thereon. The system also includes a gas distribution system. The gas distribution system includes a manifold configured to provide reaction gas within the interior, a flow modulator configured to agitate the reaction gas within the interior, and at least one nozzle in flow communication with the flow modulator. The at least one nozzle is adapted to define an agitated flow of reaction gas at the target area of the at least one component.

Another aspect is a fluoride ion cleaning system. The system includes a retort including an interior sized to receive at least one component therein. The at least one component has a target area defined thereon. The system also includes a gas distribution system. The gas distribution system includes a manifold configured to provide reaction gas within the interior, a flow modulator configured to selectively draw the reaction gas from the interior to define an agitated flow of reaction gas within the interior, and at least one nozzle in flow communication with the flow modulator. The at least one nozzle is adapted to define the agitated flow of reaction gas at the target area of the at least one component.

Yet another aspect is a fluoride ion cleaning system. The system includes a retort including an interior sized to receive at least one component therein. The at least one component has a target area defined thereon. The system also includes a gas distribution system. The gas distribution system includes a manifold configured to provide reaction gas within the interior, a flow modulator configured to selectively provide additional reaction gas to the interior to define an agitated flow of reaction gas within the interior, and at least one nozzle in flow communication with the flow modulator. The at least one nozzle adapted to define the agitated flow of reaction gas at the target area of the at least one component.

DETAILED DESCRIPTION

The embodiments described herein relate to systems and methods for improved fluoride ion cleaning of gas turbine components, for example. The systems include a retort having an interior working chamber in which reaction gas is distributed. The gas distribution system associated with the retort includes a manifold that distributes the reaction gas within the working chamber, and one or more devices that enable the reaction gas to be extracted from, or to enable additional reaction gas to be supplied to, the working chamber. The extraction or additional supply of reaction gas is defined by a pulse rate that defines an agitated flow of reaction gas at select regions within the working chamber. For example, a nozzle in flow communication with the flow modulator may be positioned in close proximity to a target area of a component to be cleaned, and a pressure differential generated by the flow modulator defines the cleaning pulsations. Thus, defining the agitated flow of reaction gas at the select regions within the working chamber facilitates cycle time reduction and cleaning quality improvement for fluoride ion cleaning of turbine components, and thus harder to clean superalloy components.

A fluoride ion cleaning (FIC) process, as disclosed herein, includes a hydrogen-enhanced, mixed-gas FIC process (hereinafter referred to as "H-FIC"), which removes oxides from surfaces and cracks of articles. The H-FIC process can be used to clean metal articles, such as but not limited to superalloy aeronautical and power generation turbine vanes, shrouds, blades, and like elements (hereinafter "turbine components").

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Accordingly, a value modified by a term or terms such as "about," "approximately," and "substantially" is not to be limited to the precise value specified. In at least some instances, the approximating language may correspond to the precision of an instrument for measuring the value. Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

Figure 1:
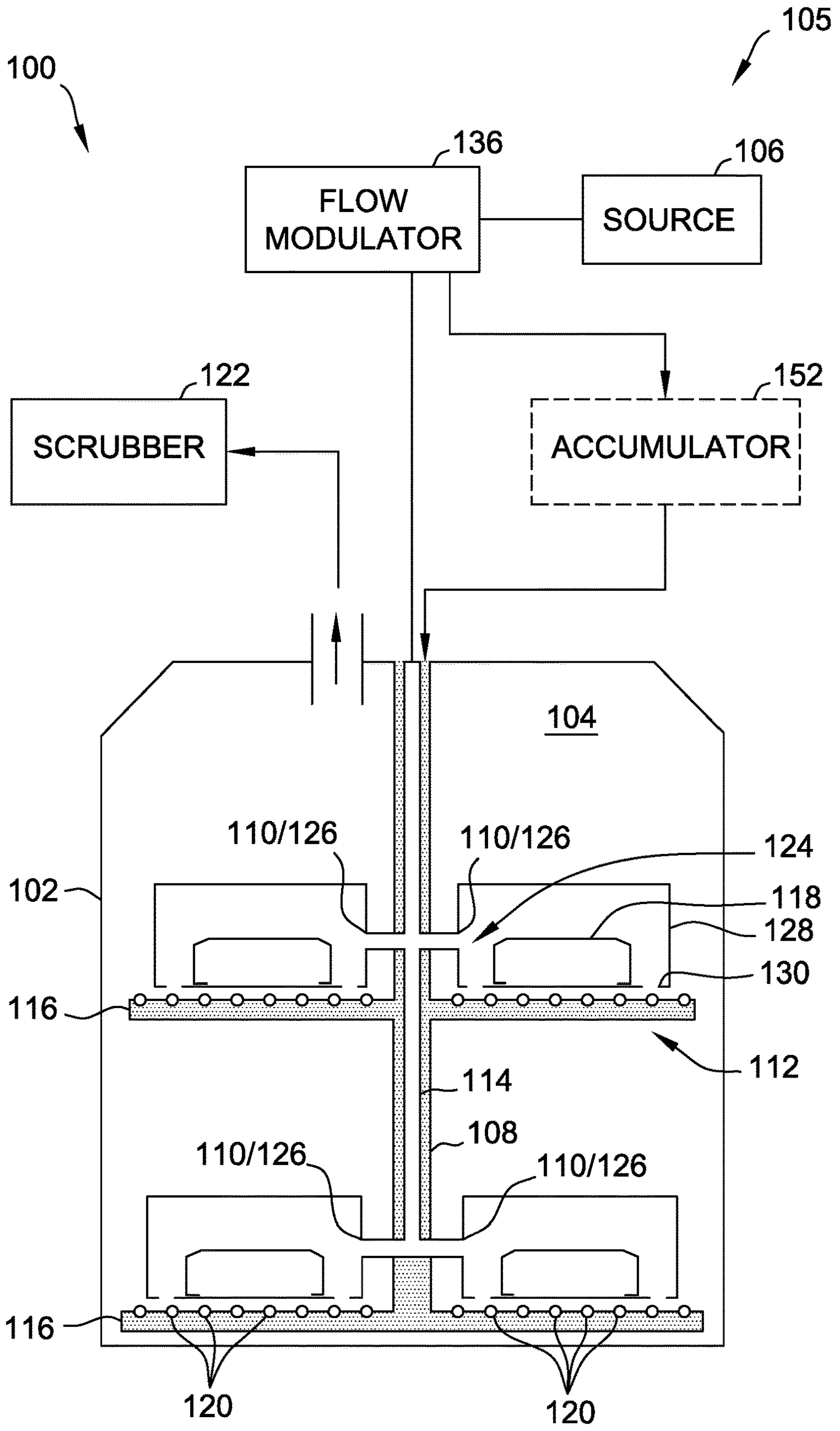
FIG. 1 is a schematic illustration of an exemplary fluoride ion cleaning system.

FIG. 1 is a schematic illustration of an exemplary FIC system 100, such as a H-FIC system. However, other H-FIC system constructions are within the scope of the disclosure. FIC system 100 includes a retort 102 (also known as a "reaction chamber") having an interior 104 sized to receive at least one component 118 therein. Retort 102 is formed from materials that are compatible with the FIC cleaning atmosphere. For example, the retort 102 may be formed from, but is not limited to being formed from, nickel-, iron-, or cobalt-based alloys.

A gas distribution system 105 of FIC system 100 includes a source 106 of reaction gases, a manifold 108, and at least one nozzle 110. Source 106 of reaction gas supplies interior 104 with reaction gas that is discharged from manifold 108 and/or nozzles 110. For example, a support rack assembly 112 provides flow communication between source 106 and manifold 108, and a supply conduit 114 provides flow communication between source 106 and nozzles 110, Support rack assembly 112 is disposed within interior 104 of retort 102, and supply conduit 114 may be disposed within support rack assembly 112. Support rack assembly 112 includes one or more platforms 116 adapted to support at least one component 118 to be cleaned thereon. Platforms 116 may be defined by grates or perforations that enable the reaction gas to pass therethrough and contact component 118. For example, manifold 108 is configured to provide and distribute reaction gas within interior 104 from a plurality of apertures 120 defined therein. Reaction gas discharged from retort 102 is channeled to a scrubber 122.

Any number of nozzles 110 may be included within interior 104 that enables FIC system 100 to function as described herein. For example, at least one nozzle 110 may be associated with a respective component 118 that is positioned within interior 104. The number of nozzles 110 positioned relative to, and associated with, a respective component 118 may be based on the size or quantity of target areas 124 defined thereon. In one embodiment, at least one target area 124 is a damaged area, although FIC system 100 is not limited to only being used with damaged areas of a component 118. For example, more than one nozzle 110 may be positioned relative to a respective component 118 to enhance the cleaning capabilities of FIC system 100.

As illustrated in FIG. 1, each nozzle 110 is defined by an opening 126 in a housing 128 that at least partially encloses a respective component 118. Housing at least partially encloses component 118 to define a localized volume of reaction gas, which may be more susceptible to variations in pressure (i.e., pulses) to be generated that facilitate enhancing the cleaning of component 118. In one example, housing 128 also includes openings 130 that enable reaction gas discharged from manifold 108 to enter housing 128. Accordingly, component 118 may be oriented within housing 128 to position target areas 124 in closer proximity to a respective nozzle 110 than to undamaged areas thereof.

Figure 2:
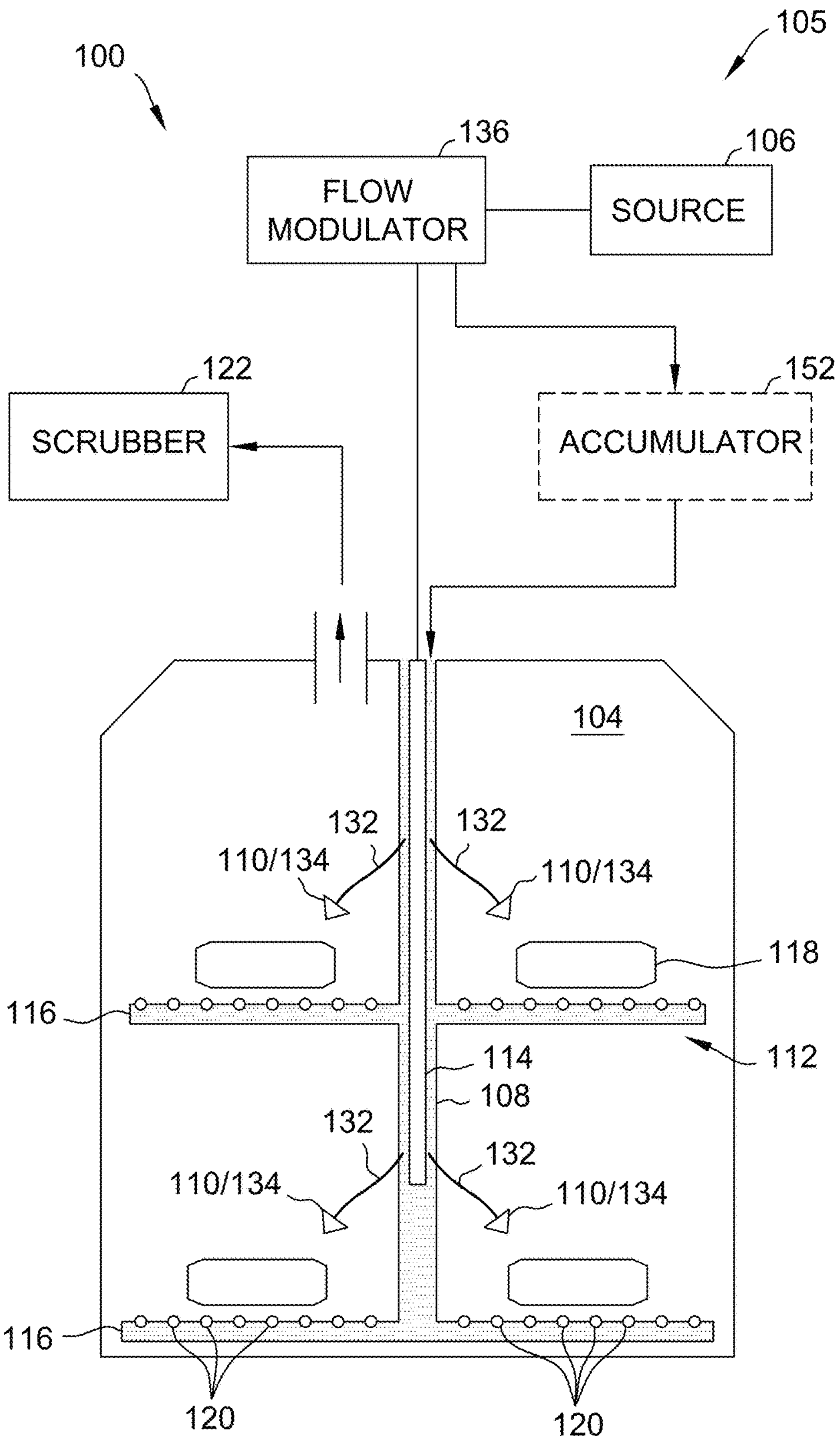
FIG. 2 is a schematic illustration of an alternative fluoride ion cleaning system.

As illustrated in FIG. 2, nozzle 110 is defined by a flexible tube 132 that is in flow communication with supply conduit 114, and a nozzle head 134 coupled to flexible tube 132. Flexible tube 132 is fabricated from material that enables nozzle head 134 to be positioned and held in generally any orientation relative to component 118. Accordingly, nozzle 110 is movable relative to manifold 108 within interior 104 to position nozzle head 134 in closer proximity to target areas 124 of component 118 than to undamaged areas thereof.

The variations in pressure may be generated by supplying additional reaction gas to housing 128, or by selectively drawing reaction gas from within housing 128, as will be described in more detail below. In the exemplary embodiments, such variations in pressure are generated by a flow modulator 136 that is coupled in flow communication between retort 102 and source 106 of reaction gas. In one embodiment, flow modulator 136 can be configured or sized and shaped for insertion within retort 102. Generating the variations in pressure may be controlled to define a pulse rate of the reaction gas that is either discharged from, or selectively extracted by, nozzles 110. For example, the pulse rate may be within a range defined between about 10 pulses/minute to about 240 pulses/minute. In one embodiment, a Pfeifenton resonator is used and/or any other type of "whistle" type of resonator that enables system 100 to work, including, but not limited to a "coaches or Pea whistle" type of resonator, or a corrugated tubing type of resonator. In such an embodiment, using a whistle type resonator, hyperdynamic pulsations may be employed with a pulse rate of between about 30 hz to about 300 hz. Thus, the pulse rate defines an agitated flow of reaction gas that facilitates enhancing the cleaning efficiency of FIC system 100. As used herein, the term agitate as applied to the flow of reaction gases is used to describe a flow modulator 136 that has at least one flow circuit that has a faster dynamic flow response as compared to that of the retort 102 itself.

Gas distribution system 105 may include any number of flow modulators 136 that enables FIC system 100 to function as described herein. For example, a single flow modulator 136 may be fluidly coupled to multiple nozzles 110 to define a substantially similar rate of pulsation at the multiple nozzles 110. Alternatively, different flow modulators 136 may be fluidly coupled to respective nozzles 110 to define different rates of pulsation at each respective nozzle 110.

Figure 3:
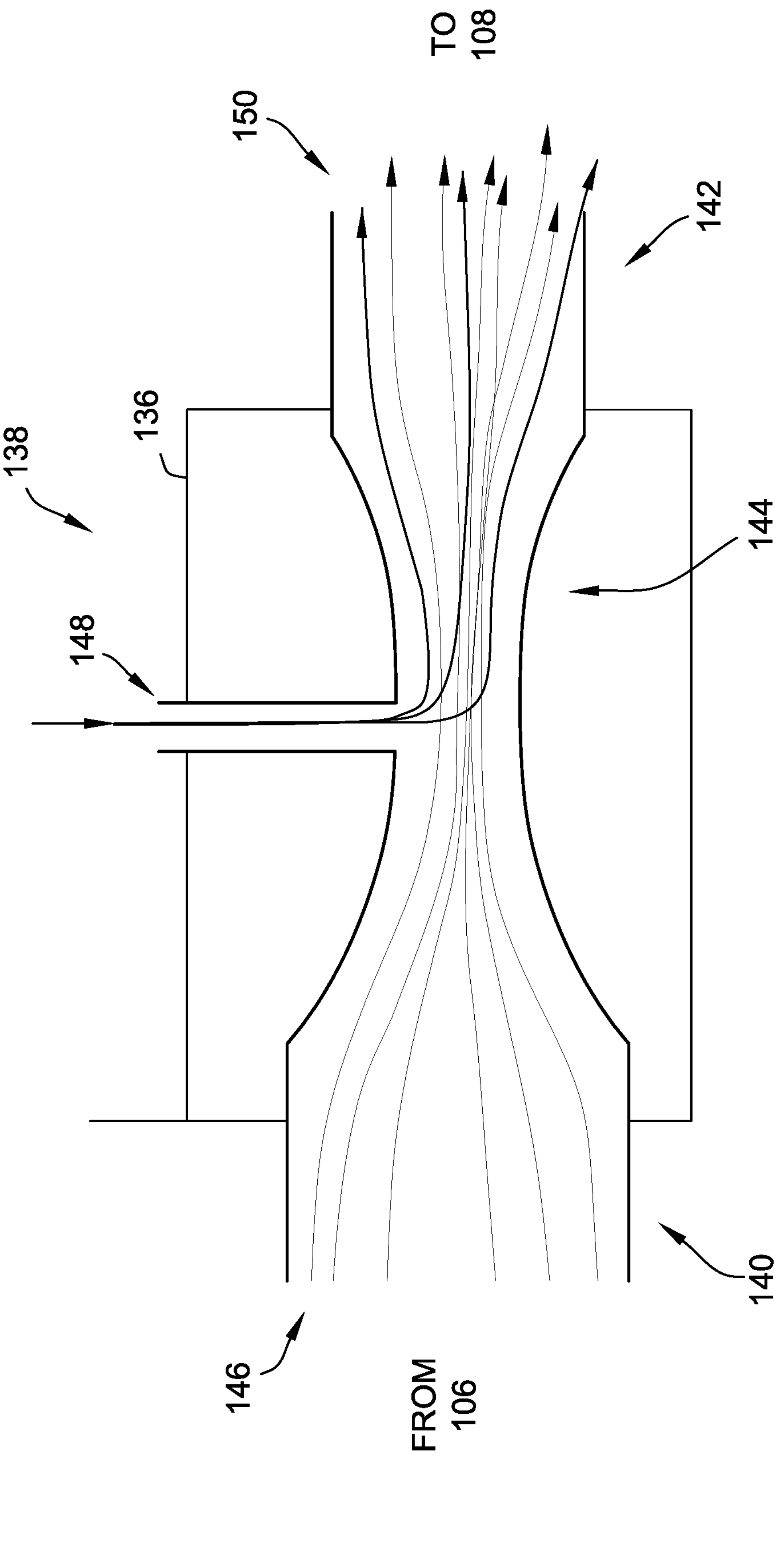
FIG. 3 illustrates an exemplary flow modulator that may be used with the systems shown in FIGS. 1 and 2.

FIG. 3 illustrates an exemplary flow modulator 136 that may be used with FIC system 100 (shown in FIGS. 1 and 2). In the exemplary embodiment, flow modulator 136 is a Venturi nozzle 138 having a first high pressure section 140, a second high pressure section 142, and a low pressure section 144 extending therebetween. Venturi nozzle 138 is shaped to define a reduced pressure relative to interior 104 of retort 102 (shown in FIGS. 1 and 2). That is, the variations in volumetric capacity of sections 140, 142, and 144 facilitate defining the reduced or lowered pressure at an inlet of low pressure section 144, as will be described in more detail below. Accordingly, a pressure differential defined between interior 104 and low pressure section 144 enables reaction gas to be selectively drawn from interior 104 to agitate the reaction gas in proximity to nozzles 110 (shown in FIGS. 1 and 2) that are fluidly coupled with Venturi nozzle 138.

In one example, first high pressure section 140 includes a first inlet 146, low pressure section 144 includes a second inlet 148, and second high pressure section 142 includes an outlet 150. First inlet 146 receives reaction gas from source 106 (shown in FIGS. 1 and 2) of reaction gas, outlet 150 discharges reaction gas towards manifold 108 (shown in FIGS. 1 and 2), and second inlet 148 is in flow communication with one or more of nozzles 110. Thus, the pressure differential defined between interior 104 and second inlet 148 defines the agitated flow of reaction gas described above in a passive and efficient manner. In such embodiments, FIC system 100 may include a response accumulator 152 (shown in FIGS. 1 and 2) coupled downstream of outlet 150. Accumulator 152 selectively changes the response time of the gas distribution manifolds relative to each other.

Figure 4:
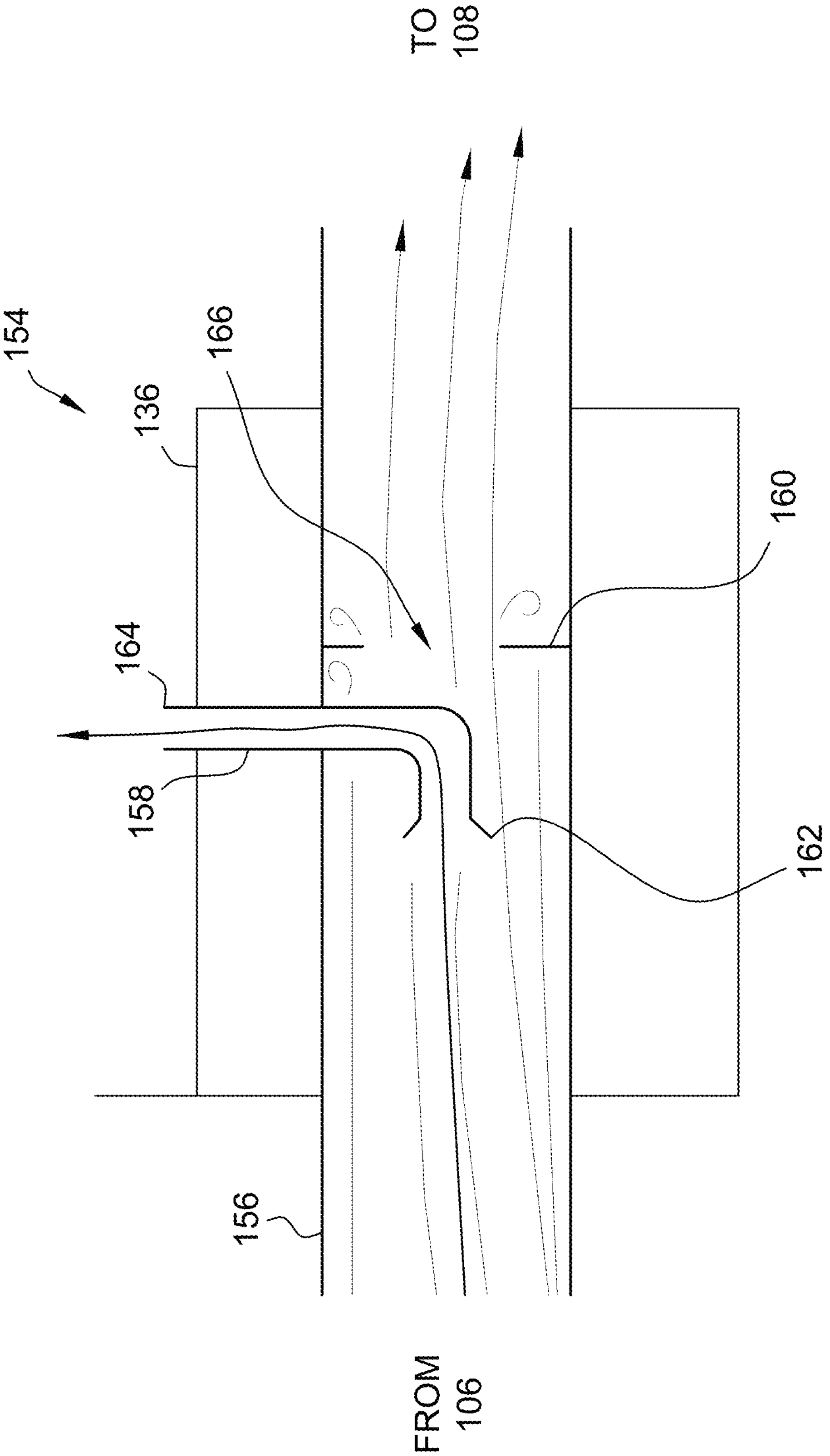
FIG. 4 illustrates an alternative flow modulator that may be used with the systems shown in FIGS. 1 and 2.

FIG. 4 illustrates an alternative flow modulator 136 that may be used with FIC system 100 (shown in FIGS. 1 and 2). In the exemplary embodiment, flow modulator 136 is a flow tap device 154 configured to selectively provide additional reaction gas to interior 104. Flow tap device 154 includes a gas supply channel 156, a dynamic flow tap 158, and a flow orifice 160. Dynamic flow tap 158 includes an inlet 162 and an outlet 164. Inlet 162 is positioned to selectively extract reaction gas channeled through gas supply channel 156. Outlet 164 is coupled in flow communication with one or more of nozzles 110 (shown in FIGS. 1 and 2). Thus, the reaction gas extracted by inlet 162 may be discharged from nozzles 110 as additional reaction gas that defines the agitated flow of reaction gas described above.

In the exemplary embodiment, the pulses can be generated from the gas supply system or vacuum exhaust system. During use, flow control of the reaction gases is turned on, and remains on for an amount of time that is long enough to establish pre-defined differential flows, thus producing the pulse in the nozzles 110. In the exemplary embodiment, proportional control valves are used to control flow, although any other control valve, including an on/off valve, could be used that enables the FIC system 100 to function as described herein. The total mass flow is much less than what is required to produce an appreciable 'pulse' in the entire retort volume. In such an embodiment, the device would be connected to supply gas. In embodiments wherein a vacuum system is used, the device is coupled to the exhaust of the retort, again creating a higher differential/local flowrate, adjacent to target areas of the component, as compared to the remaining portion of the retort volume. In the exemplary embodiment, stabilized flow through the venturi can be established in about thirty seconds.

In the illustrated example, flow orifice 160 is positioned downstream from inlet 162 of dynamic flow tap 158. Flow orifice 160 defines an opening 166 that restricts the flow of reaction gas channeled through gas supply channel 156. Thus, flow orifice 160 is sized to maintain pressurization of reaction gas provided to manifold 108, which may be based on the amount of reaction gas extracted by inlet 162.

The invention described herein benefits from a different control scheme for the reaction gasses and or retort exhaust flow as compared to at least some control schemes used with at least some known FIC systems. More specifically, in at least some known systems, setpoints are established for retort temperature, pressure and gas flow, and control schemes are used to ramp to and stabilize at these setpoints for a given period of time at desired gas concentrations. However, unlike known systems, in the present invention, the known control schemes are utilized to reach a starting point from which the 'hyperdynamic pulse' enabling equipment would be used, but a different control regime would be established wherein either the flow is established for an amount of time, a pre-defined mass is added or exhausted, or a specific flow velocity in the 'agitator' is achieved for either a specified amount of time, or a pre-defined valve position is obtained for a specified amount of time. Put more generally, the control scheme that seeks a stable equilibrium would be suspended to enable the 'hyperdynamic' control scheme. After a 'hyperdynamic' phase of control, the control system would then seek to achieve the previous setpoints, or move to a different target setpoint using known controls. The control scheme would monitor and limit to remain inside safe working limits for pressures and flows as a 'secondary' control scheme.

In one embodiment, switching between the different control schemes is directed by a protocol control. For example in one embodiment, switching is based on a monitored parameter, such as a safety critical parameter that is continuously monitored. In such an embodiment, if a safety critical parameter being monitored is exceeded, the system is switched back to the first 'standard control scheme'. In another example, switching is based on a pre-determined parameter being satisfied. For example, in such an embodiment, if the desired 'hyperdynamic' cycle is complete, the system is switched back to normal control parameters.

The embodiments described herein relate to systems and methods for improved fluoride ion cleaning of gas turbine components. The gas distribution system includes a manifold that distributes the reaction gas within the working chamber, and one or more devices that enable the reaction gas to be extracted from, or to enable additional reaction gas to be supplied to, the working chamber. The extraction or additional supply of reaction gas is defined by a pulse rate that defines an agitated flow of reaction gas at select regions within the working chamber. Defining the agitated flow of reaction gas at the select regions within the working chamber facilitates cycle time reduction and cleaning quality improvement for fluoride ion cleaning of thick walled, advanced, and thus harder to clean superalloy components. In addition, the nozzles may be retrofitted into existing FIC systems without having to change the equipment setup of the retort and/or existing reaction gas supply assembly. Furthermore, the embodiments described herein enable higher frequency FIC cleaning pulses as compared to known FIC systems.

The above description is meant to be exemplary only, and one skilled in the art will recognize that changes may be made to the embodiments described without departing from the scope of the invention disclosed. Modifications, which fall within the scope of the present invention, will be apparent to those skilled in the art, in light of a review of this disclosure, and such modifications are intended to fall within the appended claims.

Further aspects of the present disclosure are provided by the subject matter of the following clauses:

A fluoride ion cleaning system comprising a retort, and a gas distribution system. The retort comprises an interior sized to receive at least one component therein, wherein the at least one component has a target area defined thereon. The gas distribution system comprises a manifold, a flow modulator, and at least one nozzle. The manifold is configured to provide reaction gas within the interior; the flow modulator is configured to agitate the reaction gas within the interior; and the at least one nozzle is in flow communication with the flow modulator, wherein the at least one nozzle is adapted to define an agitated flow of reaction gas at the target area of the at least one component.

The system in accordance with any of the preceding clauses wherein the flow modulator selectively draws the reaction gas from the interior to generate a pressure differential that defines the agitated flow of reaction gas.

The system in accordance with any of the preceding clauses wherein the flow modulator selectively provides additional reaction gas to the interior to generate a pressure differential that defines the agitated flow of reaction gas.

The system in accordance with any of the preceding clauses wherein the gas distribution system further comprises a housing at least partially enclosing the at least one component, wherein the at least one nozzle is in flow communication with the housing to define the agitated flow within an interior of the housing.

The system in accordance with any of the preceding clauses wherein the manifold is stationary within the interior, and wherein the at least one nozzle is movable relative to the manifold within the interior.

The system in accordance with any of the preceding clauses wherein the at least one nozzle comprises a first nozzle positioned at a first component and a second nozzle positioned at a second component, wherein the flow modulator is configured to define a respective agitated flow of reaction gas with the first and second nozzles at different rates of pulsation.

The system in accordance with any of the preceding clauses wherein the flow modulator is adapted to define the agitated flow at a pulse rate defined within a range between about 10 pulses/minute and about 240 pulses/minute.

The system in accordance with any of the preceding clauses wherein the flow modulator is adapted to define the agitated flow at a pulse rate defined within a range of between about 30 hz. to about 300 hz.

The system in accordance with any of the preceding clauses wherein the flow modulator comprises a first opening in flow communication with the at least one nozzle, and a second opening in flow communication with the manifold.

The system in accordance with any of the preceding clauses wherein the flow modulator is coupled to a whistle type resonator device.

A fluoride ion cleaning system comprises a retort and a gas distribution system. The retort comprises an interior sized to receive at least one component therein, wherein the at least one component has a target area defined thereon. The gas distribution system comprises a manifold configured to provide reaction gas within the interior; a flow modulator configured to selectively draw the reaction gas from the interior to define an agitated flow of reaction gas within the interior; and at least one nozzle in flow communication with the flow modulator, wherein the at least one nozzle is adapted to define the agitated flow of reaction gas at the target area of the at least one component.

The system in accordance with any of the preceding clauses wherein the flow modulator comprises a Venturi nozzle having a high pressure section, and a low pressure section that is in flow communication with the at least one nozzle, wherein a pressure differential between the interior and the low pressure section defines the agitated flow.

The system in accordance with any of the preceding clauses wherein the Venturi nozzle comprises a first inlet in flow communication with a supply of reaction gas, a second inlet in flow communication with the at least one nozzle, and an outlet in flow communication with the manifold.

The system in accordance with any of the preceding clauses wherein the gas distribution system further comprises a housing at least partially enclosing the at least one component, wherein the at least one nozzle is in flow communication with the housing to define the agitated flow within an interior of the housing.

The system in accordance with any of the preceding clauses wherein the manifold is stationary within the interior, and wherein the at least one nozzle is movable relative to the manifold within the interior.

The system in accordance with claim 11, wherein the at least one nozzle comprises a first nozzle positioned at a first component and a second nozzle positioned at a second component, wherein the flow modulator is configured to define a respective agitated flow of reaction gas with the first and second nozzles at different rates of pulsation.

A fluoride ion cleaning system comprises a retort and a gas distribution system. The retort comprises an interior sized to receive at least one component therein, the at least one component having a target area defined thereon. The gas distribution system comprises a manifold configured to provide reaction gas within the interior; a flow modulator configured to selectively provide additional reaction gas to the interior to define an agitated flow of reaction gas within the interior; and at least one nozzle in flow communication with the flow modulator, wherein the at least one nozzle adapted to define the agitated flow of reaction gas at the target area of the at least one component.

The system in accordance with any of the preceding clauses wherein gas distribution system further comprises a gas supply channel configured to supply the reaction gas to the manifold, the flow modulator comprising a dynamic flow tap configured to extract the additional reaction gas from the gas supply channel.

The system in accordance with any of the preceding clauses wherein the gas distribution system further comprises a housing at least partially enclosing the at least one component, wherein the at least one nozzle is in flow communication with the housing to define the agitated flow within an interior of the housing.

The system in accordance with any of the preceding clauses wherein the manifold is stationary within the interior, and wherein the at least one nozzle is movable relative to the manifold within the interior.

The system in accordance with any of the preceding clauses wherein the at least one nozzle comprises a first nozzle positioned at a first component and a second nozzle positioned at a second component, wherein the flow modulator is configured to define a respective agitated flow of reaction gas with the first and second nozzles at different rates of pulsation.

A gas turbine engine component is cleaned using the process of any of the preceding clauses, wherein the gas turbine engine component sized for insertion within the interior of the retort, wherein the target area of the gas turbine engine is substantially as clean as the remainder of the gas turbine engine component.

Exemplary embodiments of fluoride ion cleaning systems are described above in detail. The systems and methods described herein are not limited to the specific embodiments described herein, but rather, steps of the methods may be utilized independently and separately from other steps described herein. For example, the methods described herein are not limited to practice with the cleaning of gas turbine engine components as described herein. Rather, the exemplary embodiment can be implemented and utilized in connection with any application that where enhanced cleaning using fluoride ions is desired.

Although specific features of various embodiments of the invention may be shown in some drawings and not in others, this is for convenience only. Moreover, references to “one embodiment” in the above description are not intended to be interpreted as excluding the existence of additional embodiments that also incorporate the recited features. In accordance with the principles of the invention, any feature of a drawing may be referenced and/or claimed in combination with any feature of any other drawing.

While the invention has been described in terms of various specific embodiments, those skilled in the art will recognize that the invention can be practiced with modification within the spirit and scope of the claims.

What is claimed is:

1. A fluoride ion cleaning system comprising:
- a retort comprising an interior sized to receive at least one component therein, the at least one component having a target area defined thereon; and
- a gas distribution system comprising:
  - a source of a reaction gas;
  - a flow modulator in direct flow communication with the source of the reaction gas, the flow modulator configured to agitate the reaction gas within the interior;
  - a manifold in flow communication with the flow modulator, the manifold configured to provide the reaction gas within the interior of the retort;
  - a supply conduit in flow communication with the flow modulator; and
- at least one nozzle in flow communication with the flow modulator via the supply conduit, the at least one nozzle adapted to define an agitated flow of reaction gas at the target area of the at least one component,
- wherein the flow modulator further includes:
  - an inlet in flow communication with the source of the reaction gas, the inlet receiving the reaction gas from the source;
  - an outlet formed opposite the inlet, the outlet in flow communication with the manifold for discharging the reaction gas to the manifold; and
  - a distinct outlet formed between the inlet and the outlet, the distinct outlet in flow communication with the at least one nozzle.

2. The system in accordance with claim 1, wherein the flow modulator is a flow tap device configured to selectively provide additional reaction gas to the interior.

3. The system in accordance with claim 1, wherein the gas distribution system further comprises a housing at least partially enclosing the at least one component, wherein the at least one nozzle is in flow communication with the housing to define the agitated flow within an interior of the housing.

4. The system in accordance with claim 1, wherein the manifold is stationary within the interior, and wherein the at least one nozzle is movable relative to the manifold within the interior.

5. The system in accordance with claim 1, wherein the at least one nozzle comprises a first nozzle positioned at a first component and at least one second nozzle positioned at a second component, wherein the flow modulator is configured to define a respective agitated flow of reaction gas with the first and second nozzles at different rates of pulsation.

6. The system in accordance with claim 1, wherein the flow modulator is adapted to define the agitated flow at a pulse rate defined within a range between about 10 pulses/minute and about 240 pulses/minute.

7. The system in accordance with claim 1, wherein the flow modulator is adapted to define the agitated flow at a pulse rate defined within a range of between about 30 hz. to about 300 hz.

8. The system in accordance with claim 1, wherein the flow modulator is coupled to a whistle type resonator device.

9. A fluoride ion cleaning system comprising:
- a retort comprising an interior sized to receive at least one component therein, the at least one component having a target area defined thereon; and
- a gas distribution system comprising:
  - a flow modulator in direct flow communication with the source of the reaction gas, the flow modulator configured to selectively provide additional reaction gas to the interior to define an agitated flow of reaction gas within the interior;
  - a manifold in flow communication with the flow modulator, the manifold configured to provide the reaction gas within the interior of the retort; and
- at least one nozzle in flow communication with the flow modulator, the at least one nozzle adapted to define the agitated flow of reaction gas at the target area of the at least one component:
  - wherein the flow modulator further includes:
    - an inlet in flow communication with the source of the reaction gas, the inlet receiving the reaction gas from the source;
    - an outlet formed opposite the inlet. the outlet in flow communication with the manifold for discharging the reaction gas to the manifold; and
    - a distinct outlet formed between the inlet and the outlet, the distinct outlet in flow communication with the at least one nozzle.

10. The system in accordance with claim 9, wherein gas distribution system further comprises a gas supply channel configured to supply the reaction gas to the manifold, the flow modulator comprising a dynamic flow tap configured to extract the additional reaction gas from the gas supply channel.

11. The system in accordance with claim 9, wherein the gas distribution system further comprises a housing at least partially enclosing the at least one component, wherein the at least one nozzle is in flow communication with the housing to define the agitated flow within an interior of the housing.

12. The system in accordance with claim 9, wherein the manifold is stationary within the interior, and wherein the at least one nozzle is movable relative to the manifold within the interior.

13. The system in accordance with claim 9, wherein the at least one nozzle comprises a first nozzle positioned at a first component and a second nozzle positioned at a second component, wherein the flow modulator is configured to define a respective agitated flow of reaction gas with the first and second nozzles at different rates of pulsation.

14. A gas turbine engine component cleaned using the process of claim 9, the gas turbine engine component sized for insertion within the interior of the retort, wherein the target area of the gas turbine engine is substantially as clean as the remainder of the gas turbine engine component.

* * * * *